(12) United States Patent
Böhm et al.

(10) Patent No.: US 11,319,954 B2
(45) Date of Patent: May 3, 2022

(54) PUMP DEVICE

(71) Applicant: CPT GROUP GmbH, Hannover (DE)

(72) Inventors: Christian Böhm, Frankfurt am Main (DE); Silviu Soptica, Giroc (RO)

(73) Assignee: Vitesco Technologies GmbH, Hannover (DE)

(*) Notice: Subject to any disclaimer, the term of this patent is extended or adjusted under 35 U.S.C. 154(b) by 51 days.

(21) Appl. No.: 16/507,911

(22) Filed: Jul. 10, 2019

(65) Prior Publication Data
US 2020/0018316 A1    Jan. 16, 2020

(30) Foreign Application Priority Data

Jul. 11, 2018   (EP) .................................. 18465547

(51) Int. Cl.
    *F04C 15/00*      (2006.01)
    *F16H 57/04*      (2010.01)
    *F04B 17/05*      (2006.01)

(52) U.S. Cl.
    CPC .......... *F04C 15/0061* (2013.01); *F04B 17/05* (2013.01); *F04C 15/008* (2013.01); *F16H 57/0439* (2013.01)

(58) Field of Classification Search
    CPC ........ F04B 17/03; F04B 17/05; F04C 15/008; F04C 15/0061; F16H 3/005; F16H 3/54; F16H 57/0439; F16H 61/0028
    USPC .................................................... 417/16, 374
    See application file for complete search history.

(56) References Cited

U.S. PATENT DOCUMENTS

| | | | | |
|---|---|---|---|---|
| 4,137,798 A | * | 2/1979 | Sisk | F16H 3/005 475/12 |
| 4,475,872 A | * | 10/1984 | Foughty | F04B 47/02 166/68.5 |
| 5,947,854 A | * | 9/1999 | Kopko | F16H 3/72 475/2 |

(Continued)

FOREIGN PATENT DOCUMENTS

| | | |
|---|---|---|
| DE | 3 614 819 | 11/1987 |
| DE | 102014200723 B3 | 2/2015 |

(Continued)

OTHER PUBLICATIONS

Office Action dated Nov. 4, 2021 issued in European Patent Application No. 18465547.0.

*Primary Examiner* — Devon C Kramer
*Assistant Examiner* — Joseph S. Herrmann
(74) *Attorney, Agent, or Firm* — Cozen O'Connor

(57) ABSTRACT

A pump device for a motor vehicle includes: a pump having a first pump member and a second pump member, the first and second pump members being movable relative to one another; an electric drive having a drive housing and an output shaft rotatable with respect to the drive housing; and a gear mechanism, which couples the output shaft to the first pump member and, by reversing a direction of rotation of the electric drive, is switchable between a first and an opposite second transmission ratio. The gear mechanism has: a planet stage having a planet carrier rotationally fixed relative to the drive housing, and/or first and second freewheels, oppositely directed with respect to one another, and which are arranged axially behind one another, and/or the second pump member has a drive shaft rotatable relative to the output shaft.

5 Claims, 4 Drawing Sheets

(56) References Cited

U.S. PATENT DOCUMENTS

| | | | | |
|---|---|---|---|---|
| 8,714,940 | B2* | 5/2014 | Nomura | B60K 6/445 |
| | | | | 417/223 |
| 2014/0255210 | A1* | 9/2014 | Hwang | F16H 61/0028 |
| | | | | 417/16 |
| 2018/0371966 | A1* | 12/2018 | Boehm | F01M 1/16 |

FOREIGN PATENT DOCUMENTS

| | | | |
|---|---|---|---|
| DE | 102015212537 | 1/2017 | |
| DE | 10 2015 218 550 | 3/2017 | |
| DE | 10 2017 117 600 | 3/2018 | |
| GB | 2 191 543 | 12/1987 | |
| WO | WO 2013/007247 | 1/2013 | |
| WO | WO 2014/202366 | 12/2014 | |
| WO | WO 2015/065279 | 5/2015 | |
| WO | WO-2017063793 A1 * | 4/2017 | F04C 2/321 |

* cited by examiner

PUMP DEVICE

RELATED APPLICATION

This application claims the priority of European Application No. EP 18465547 filed Jul. 11, 2018, the content of which is hereby incorporated by reference.

BACKGROUND OF THE INVENTION

1. Field of the Invention

The present invention relates to a pump device, in particular for a motor vehicle, to a motor vehicle having the pump device and to a method for operating the pump device.

2. Description of the Related Art

DE 10 2017 117 600 A1 discloses a pump device for arranging in a motor vehicle transmission, having an electric motor and a planet gear mechanism which has a planet carrier and two freewheels arranged radially above one another and, by reversing the direction of rotation of the electric motor, can be switched between a first and opposite second transmission ratio.

SUMMARY OF THE INVENTION

An object according to one aspect of the present invention is to improve a pump device, in particular the operation thereof.

Said object may be achieved by a pump device, a motor vehicle having the pump device described herein, and a method for operating the pump device described herein.

According to one aspect of the present invention, a pump device has a pump having two pump members, which are movable, in particular rotatable, relative to one another and which will also be referred to hereinbelow, without limiting the generality, as a first and second pump member, and an electric drive having a drive housing and an output shaft that can be rotated with respect thereto (by the drive or actively or electrically/by electric motor), for operating the pump.

In one aspect, the first pump member can have, in particular be, a rotor and the second pump member can have, in particular be, a pump housing in which the rotor is (rotatably) arranged, in particular to deliver fluid. Conversely, in another embodiment, the first pump member can have, in particular be, a pump housing and the second pump member can have, in particular be, a rotor (rotatably) arranged in the pump housing, in particular to deliver fluid.

In one development, the pump housing is rotationally fixed (arranged in a rotationally fixed manner) relative to the drive housing. It is thereby possible in one aspect for a more compact and/or more stable pump device to be realized.

In another development, the pump housing is rotatable (rotatably mounted) relative to the drive housing. It is thereby possible in one aspect for a differential pump to be realized whose operation can advantageously be varied by rotation of the pump housing relative to the drive housing and rotation, in the same and/or opposite direction, of the rotor in the pump housing by the output shaft.

According to an aspect of the present invention, the pump device has a single-stage or multi-stage gear mechanism which (rotationally) couples the output shaft of the electric drive to the first pump member, that is to say in particular the rotor or pump housing, and, in one embodiment, can be switched, solely by reversing the direction of rotation of the electric drive or the direction of rotation of its output shaft, between a first transmission ratio and a second transmission ratio opposite to the first transmission ratio.

In other words, in the first transmission ratio, a first input direction of rotation of the gear mechanism or of the output shaft of the electric drive is transferred into an (output) direction of rotation of the gear mechanism or of a (first) pump member, and, in the second transmission ratio, a second input direction of rotation, opposite to the first input direction of rotation, of the gear mechanism or of the output shaft of the electric drive is transferred into the same (uniform) (output) direction of rotation of the gear mechanism or of a (first) pump member. It is thereby possible in one embodiment for the gear mechanism to be switched advantageously, preferably without a dedicated actuator.

In one aspect, the first transmission ratio has a different value than the second transmission ratio. As a result, in an aspect, the same rotational speed (in terms of value) of the electric drive or of its output shaft can drive the pump at different rates. As a result, in one embodiment, different pump operating points, in particular a first operating point with a low/relatively low delivery pressure and a high/relatively high delivery volume and a second operating point with a high/relatively high delivery pressure and low/relatively low delivery volume can advantageously be realized by the same rotational speed (in terms of value) of the electric drive, and thus the drive, in one embodiment, can be operated in a more advantageous operating range and/or be designed to be more compact. In one aspect, one of the two transmission ratios is equal to 1. It is thereby possible in one embodiment for a particularly advantageous operating point to be realized.

According to an aspect of the present invention, the gear mechanism has only one planet stage having a planet carrier that is rotationally fixed relative to the drive housing, in particular is arranged in a rotationally fixed manner on a housing of the pump device.

It is thereby possible in one aspect, in contrast with the conventional rotating planet carrier of DE 10 2017 117 600 A1, for dynamic loads, in particular unbalances, to be reduced and/or for the gear mechanism to be configured to be more compact.

In addition to or as an alternative to the planet carrier that is rotationally fixed with respect to the drive housing, the gear mechanism has, according to an aspect of the present invention, at least two, in particular oppositely directed (oppositely acting), freewheels which are arranged axially behind one another or (arranged) following one another and by which, in one embodiment, depending on the direction of rotation of the output shaft of the electric drive, different gear mechanism members of the gear mechanism, in one embodiment of the aforementioned planet stage, the one (first) pump member is driven.

It is thereby possible in one embodiment, in contrast with DE 10 2017 117 600 A1, for dynamic loads, in particular unbalances, to be further reduced and/or for the gear mechanism to be even more compact.

In addition to or as an alternative to the planet carrier that is rotationally fixed with respect to the drive housing, and in addition to or as an alternative to the freewheels which are arranged axially behind one another, according to one embodiment of the present invention the other (second) pump member, that is to say in particular the rotor or the pump housing, has a drive shaft which can be rotated relative to the output shaft, in particular actively or under actuation.

As a result, an above-explained differential pump can be actuated particularly advantageously, in particular in a more compact manner. Particularly in this case it is possible for the electric drive, in one embodiment, to act as a generator in certain operating states or ranges and thus support or brake/retard the pump housing or rotor.

In one embodiment, the one (first) pump member is connected, in particular directly, in one or the (first) freewheel to a sun wheel. Additionally or alternatively, in one embodiment the one (first) pump member is connected in one or the further freewheel, which is in particular oppositely directed with respect to the one (first) freewheel, to an annulus of one, in particular the, planet stage of the gear mechanism.

It is thereby possible in one embodiment for in each case, in particular in combination with one another, advantageous transmission ratios to be realized and/or for the gear mechanism to be designed to be more compact.

In one aspect, the output shaft of the electric drive is connected in a rotationally fixed manner to a sun wheel of an, in particular of the (aforementioned), planet stage of the gear mechanism. Additionally or alternatively, in an aspect, the output shaft of the electric drive is connected in one, in particular the one (first), freewheel to the one pump member.

It is thereby possible in one embodiment for in each case, in particular in combination with one another, advantageous transmission ratios to be realized and/or for the gear mechanism to be designed to be more compact.

A pump device according to the present invention can be used particularly advantageously in motor vehicles, in particular for the hydraulic, in particular oil, supply of a (motor) vehicle transmission.

Correspondingly, according to one embodiment of the present invention, a motor vehicle has a pump device described herein which, in one development, is provided, in particular designed, or is used for the hydraulic, in particular oil, supply of a (motor) vehicle transmission.

In one embodiment, a second drive, in one embodiment an internal combustion engine, in particular for driving the motor vehicle, is coupled to the drive shaft of the second pump member or this is provided, in particular designed, for this purpose or is used for this purpose.

It is thereby possible for the pump in one embodiment to be operated particularly advantageously, in particular in a more energy-saving manner, more compactly and/or variably/more variably.

The output shaft and drive shaft are parallel in one embodiment, and concentric in one development.

In this way, in one embodiment, the pump device can be designed to be more compact.

To operate a pump device described herein, according to one aspect of the present invention the electric drive is operated in a first operating mode with a first direction of rotation, in one embodiment with a rotational speed, in particular in order to operate the pump in a first operating point with a low/relatively low delivery pressure and high/relatively high delivery volume, and operated in a second operating mode with a second direction of rotation opposite to the first direction of rotation, in one embodiment with the same rotational speed (in terms of value), in particular in order to operate the pump in a second operating point with a high/relatively high delivery pressure and low/relatively low delivery volume.

BRIEF DESCRIPTION OF THE DRAWINGS

Further advantageous developments of the present invention will emerge from the following description of preferred embodiments. To this end, in the figures, in part in a schematic manner.

DETAILED DESCRIPTION OF THE PRESENTLY PREFERRED EMBODIMENTS

Figure 1:
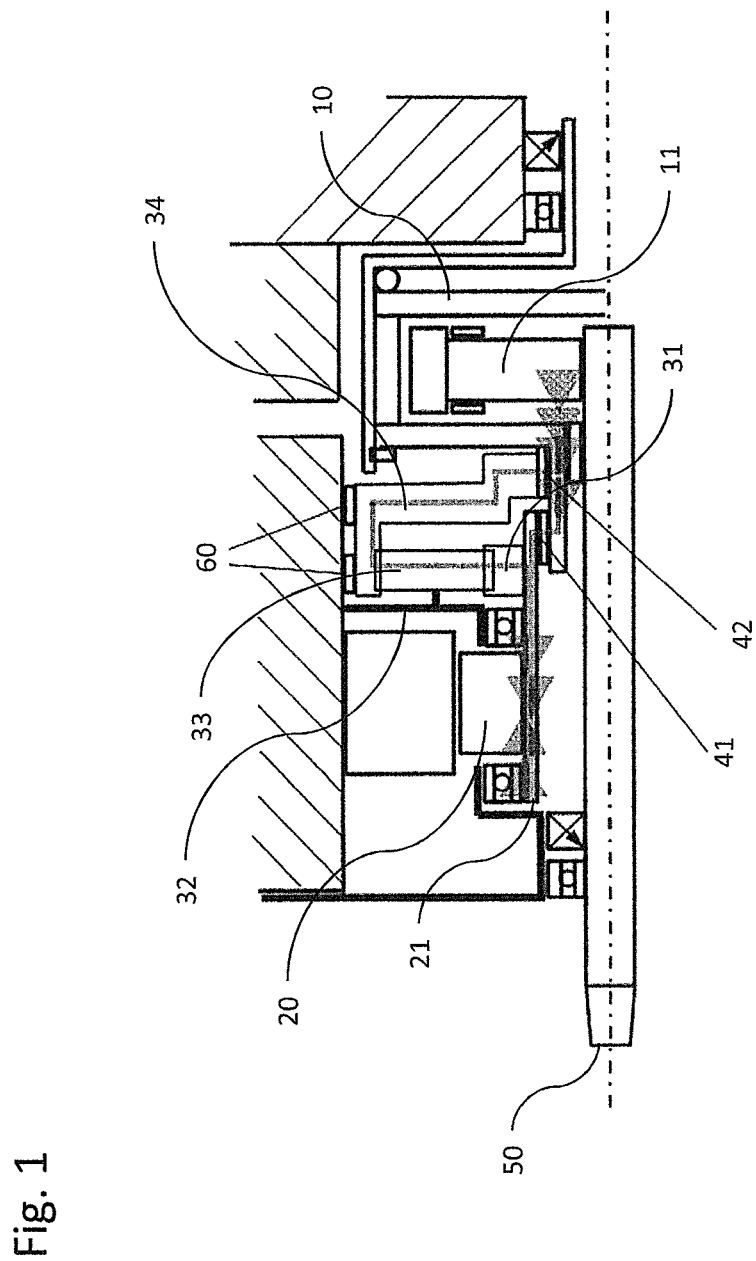
FIG. 1 shows a pump device.

FIG. 1 shows a pump device according to one embodiment of the present invention in an axial or meridian section.

The pump device has a pump having a first pump member in the form of a rotatably mounted pump housing 10 and second pump member in the form of a rotor 11 rotatably arranged in the pump housing 10.

The pump device has an electric drive having a drive housing 20 and an output shaft 21 which can be rotated with respect thereto, and a gear mechanism having a planet stage which couples the output shaft 21 to the one (first) pump member or pump housing 10.

The second pump member, the rotor 11, has a drive shaft 50 rotatable relative to the output shaft 21 and arranged concentrically in the hollow output shaft 21 and is coupled to a second drive, in one embodiment an internal combustion engine (not shown).

The planet stage has a sun wheel 31 to which the output shaft 21 is connected in a rotationally fixed manner, an annulus 34 which is mounted rotatably relative to the drive housing 20 by bearings 60, and planets 33 whose external toothing is in engagement with an external toothing of the sun wheel 31 and an internal toothing of the annulus 34 and which are rotatably mounted on a planet carrier 32 of the planet stage, which planet carrier is arranged in a rotationally fixed manner relative to the drive housing 20.

The first pump member, pump housing 10, is connected in one freewheel 41 to the sun wheel 31 or the output shaft 21 and in one oppositely directed further freewheel 42 to the annulus 34.

The two freewheels 41, 42 are arranged axially behind one another.

Figure 5:
FIG. 5 shows a method for operating one of the exemplary pump devices according to the present invention.

In a first operating mode (FIG. 5: S10), the electric drive is operated with a first direction of rotation or rotates its output shaft 21 relative to its drive housing 20 in a first direction of rotation.

Here, freewheel 41 locks such that the output shaft 21 and the first pump member, pump housing 10, rotate jointly at the same rotational speed.

By virtue of the fixed planet carrier 32, the planets 33 rotate the annulus 34 in a direction of rotation opposite to the first direction of rotation of output shaft 21 or pump housing 10. Here, the freewheel 42 directed oppositely with respect to the freewheel 41 opens.

In a second operating mode (FIG. 5: S20), the electric drive is operated with a second direction of rotation opposite to this first direction of rotation or rotates its output shaft 21 relative to its drive housing 20 in an opposite second direction of rotation.

By virtue of the fixed planet carrier 32, the planets 33 rotate the annulus 34 in a direction of rotation opposite to this second direction of rotation of the output shaft 21. Here, the freewheel 42 directed oppositely with respect to the freewheel 41 now locks and the annulus 34 rotates the one (first) pump member or pump housing 10 in the opposite direction to the second direction of rotation of the output shaft 21, wherein freewheel 41 opens.

Consequently, the gear mechanism is switched between a first and opposite second transmission ratio solely by reversing the direction of rotation of the electric drive.

By varying the difference between the rotational speed of rotor 11 (by drive shaft 50) and pump housing 10 (by electric drive 20, 21), the operating point of the pump can be advantageously varied and, moreover, drive energy from the internal combustion engine can be used.

Figure 2:
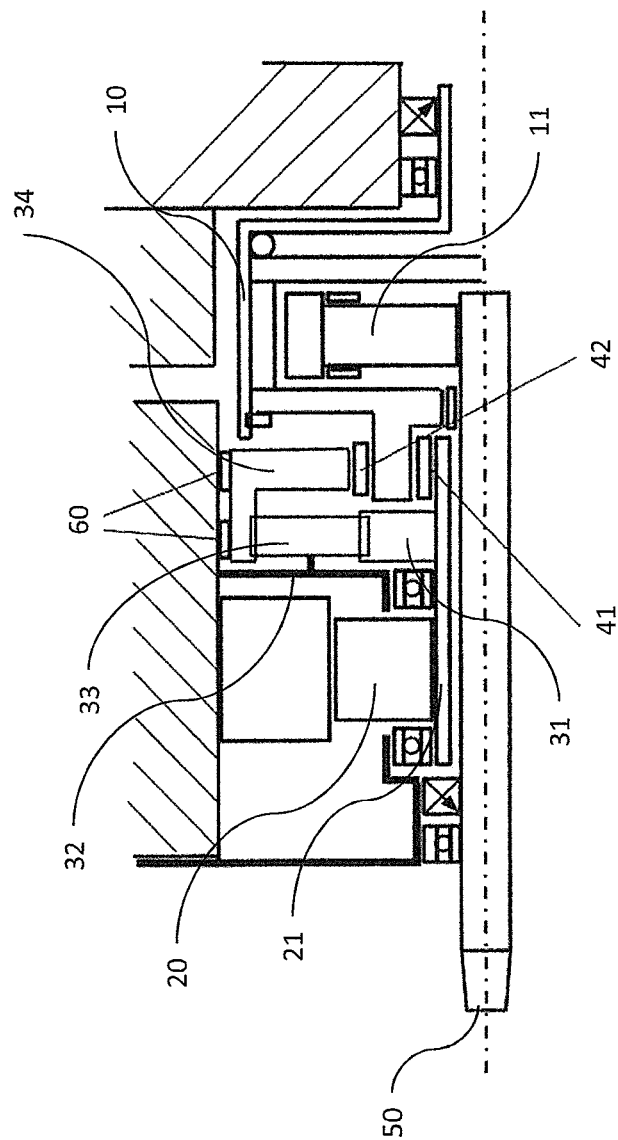
FIG. 2 shows another exemplary pump device.

FIG. 2 shows a pump device according to a further embodiment of the present invention in an illustration corresponding to FIG. 1. Features corresponding to one another are identified by identical reference signs, such that reference is made to the above description and differences will be discussed below.

In the embodiment of FIG. 2, the freewheels 41, 42 are arranged radially above one another.

Figure 3:
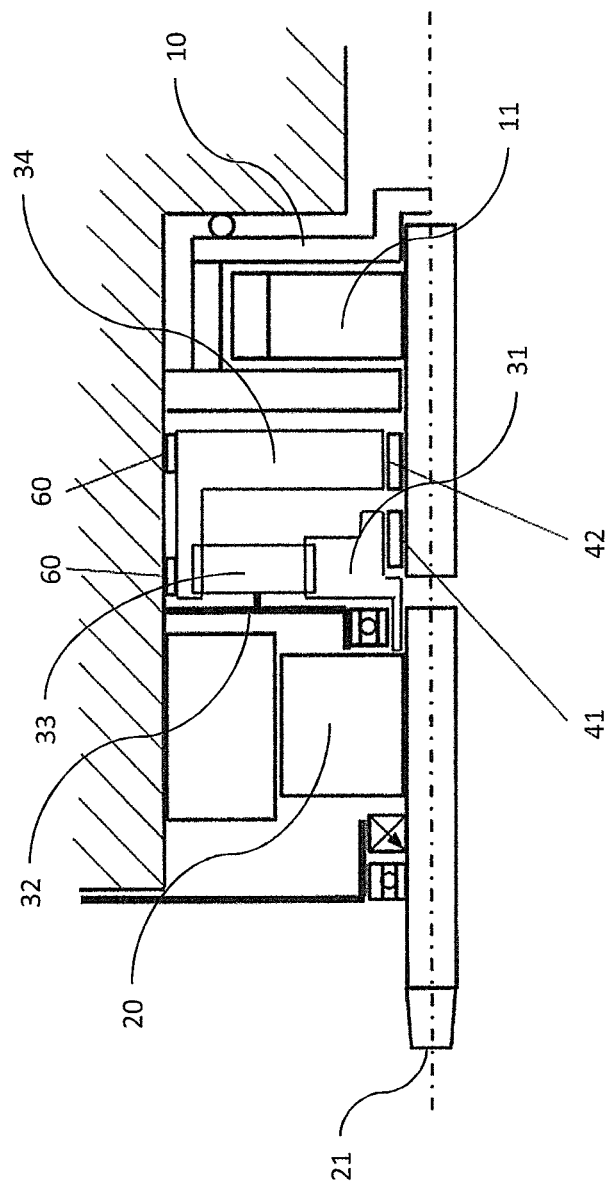
FIG. 3 shows another exemplary pump device.

FIG. 3 shows a pump device according to a further embodiment of the present invention in an illustration corresponding to FIG. 1. Features corresponding to one another are identified by identical reference signs, such that reference is made to the above description for FIG. 1 and differences will be discussed below.

In the embodiment of FIG. 3, the pump housing 10 is rotationally fixed relative to the drive housing 20, and the drive shaft 50 for driving the pump housing 10 is dispensed with.

The first pump member is, in this case, the rotor 11, and the second pump member is the pump housing 10 in which the rotor 11 is arranged.

The gear mechanism or the planet stage couples the output shaft 21 of the electric drive to the first pump member, rotor 11.

The first pump member, the rotor 11, is connected in the freewheel 41 to the sun wheel 31 or the output shaft 21 and in the oppositely directed further freewheel 42 to the annulus 34.

In the first operating mode, freewheel 41 locks such that the output shaft 21 and the first pump member, the rotor 11, rotate jointly at the same rotational speed (transmission ratio=1).

By virtue of the fixed planet carrier 32, the planets 33 rotate the annulus 34 in a direction of rotation opposite to the first direction of rotation of output shaft 21 or rotor 11. Here, the freewheel 42 directed oppositely with respect to the freewheel 41 opens.

In the second operating mode, the electric drive is operated with an opposite direction of rotation or rotates its output shaft 21 relative to its drive housing 20 in an opposite direction of rotation.

By virtue of the fixed planet carrier 32, the planets 33 rotate the annulus 34 in a direction of rotation opposite to this direction of rotation of the output shaft 21. Here, the freewheel 42 directed oppositely with respect to the freewheel 41 now locks and the annulus 34 rotates the first pump member, the rotor 11, in the opposite direction to the direction of rotation of the output shaft 21, wherein freewheel 41 opens. The transmission ratio is (in terms of value) not equal to 1.

Figure 4:
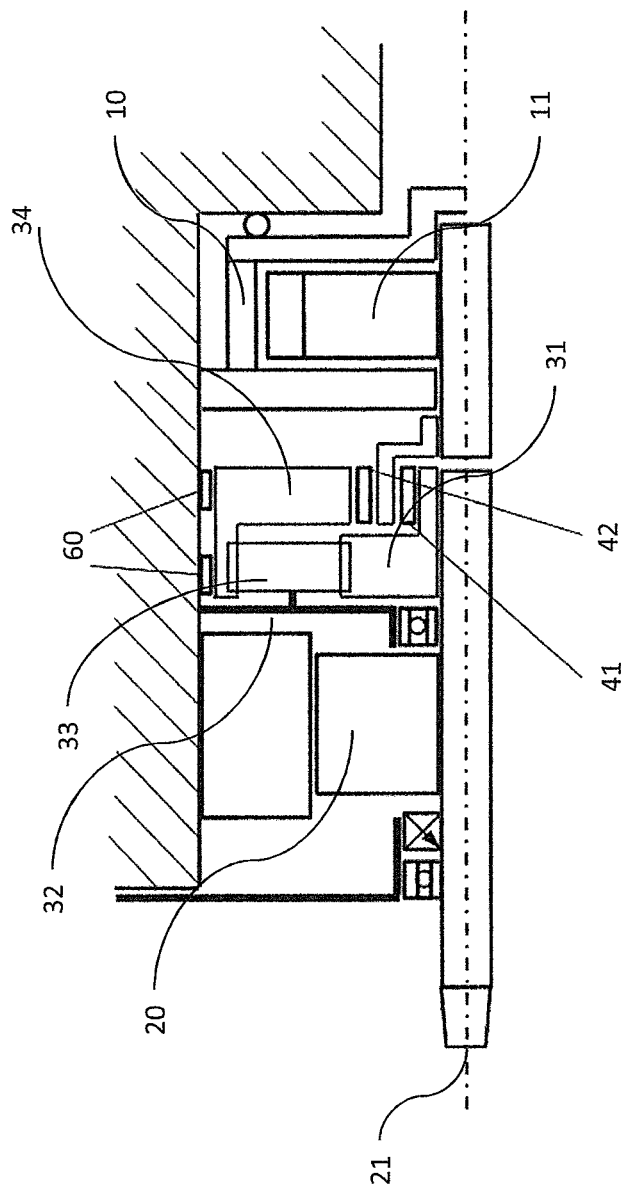
FIG. 4 shows another exemplary pump device.

FIG. 4 shows a pump device according to a further embodiment of the present invention in an illustration corresponding to FIG. 3. Features corresponding to one another are identified by identical reference signs, such that reference is made to the above description for FIG. 3 and differences will be discussed below.

In the embodiment of FIG. 4, the freewheels 41, 42 are arranged radially above one another.

Although exemplary embodiments have been discussed in the above description, it should be noted that numerous modifications are possible. Furthermore, it should be noted that the exemplary embodiments are merely examples which are not intended to limit the scope of protection, applications and structure in any way. Rather, the above description will provide a person skilled in the art with a guideline for implementing at least one exemplary embodiment, wherein various modifications, in particular with regard to the function and arrangement of the described constituent parts, may be made without departing from the scope of protection as defined by the claims and by these equivalent combinations of features.

| List of reference signs | |
|---|---|
| 10 | Pump housing |
| 11 | Rotor |
| 20 | Drive housing |
| 21 | Output shaft |
| 31 | Sun wheel |
| 32 | Planet carrier |
| 33 | Planet |
| 34 | Annulus |
| 41, 42 | Freewheel |
| 50 | Drive shaft |
| 60 | Bearing |

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A pump device for a motor vehicle, the pump device comprising:
   a pump having a first pump member and a second pump member, the first pump member and the second pump member being movable relative to one another;
   an electric drive having a drive housing and an output shaft rotatable with respect to the drive housing;
   a gear mechanism, which couples the output shaft to the first pump member and, by reversing a direction of rotation of the electric drive, is switchable between a first transmission ratio and an opposite second transmission ratio,
   wherein the gear mechanism has:
      a planet stage having a planet carrier rotationally fixed relative to the drive housing, and
      a first freewheel and a second freewheel, oppositely directed with respect to one another, and which are arranged axially one behind the other, and
      the second pump member has a drive shaft rotatable relative to the output shaft, wherein the first pump member is connected by the first freewheel to a sun wheel and/or connected in the second freewheel to an annulus of the planet stage of the gear mechanism, and wherein a second drive, comprising an internal combustion engine, is coupled to the drive shaft.

2. The pump device as claimed in claim 1, wherein the output shaft is connected by the first freewheel to the first pump member and/or the output shaft is rotationally fixed to the sun wheel of the planet stage of the gear mechanism.

3. The pump device as claimed in claim 1, wherein the first pump member comprises a pump housing and the second pump member comprises a rotor arranged in the pump housing.

4. A motor vehicle comprising: the pump device as claimed in claim 1; and a vehicle transmission, wherein the pump device is configured as a hydraulic supply of the vehicle transmission.

5. A method for operating the pump device as claimed in claim 1, wherein the electric drive is operated in a first operating mode with a first direction of rotation and in a second operating mode with an opposite second direction of rotation.

\* \* \* \* \*